United States Patent [19]

Souza

[11] 4,103,448
[45] Aug. 1, 1978

[54] REPEATING ANIMAL TRAP WITH SIDE EXTENSION

[75] Inventor: Anthony J. Souza, Lancaster, Pa.

[73] Assignee: Woodstream Corporation, Lititz, Pa.

[21] Appl. No.: 688,463

[22] Filed: May 20, 1976

[51] Int. Cl.² ............................................. A01M 23/08
[52] U.S. Cl. ............................................. 43/67; 43/58
[58] Field of Search ................. 43/66, 67, 65, 68, 64, 43/60, 76, 69, 61, 81, 88, 100, 105, 58

[56] References Cited
U.S. PATENT DOCUMENTS

| 179,940 | 7/1876 | Morris | 43/67 |
|---|---|---|---|
| 760,738 | 5/1904 | Huguley | 43/67 |
| 1,102,896 | 7/1914 | Fischer | 43/67 |
| 1,486,390 | 3/1924 | Pedersen | 43/105 |
| 1,602,677 | 10/1926 | Jorgensen | 43/67 |
| 1,792,774 | 2/1931 | Snider | 43/81 |
| 2,217,136 | 10/1940 | Roff | 43/67 |
| 3,786,591 | 1/1974 | Morford | 43/66 |

*Primary Examiner*—Clifford D. Crowder

*Attorney, Agent, or Firm*—Holman & Stern

[57] ABSTRACT

A repeating animal trap of the inclined plane type including a collection means defining an enlarged container for confining animals with at least one trap means set in an opening in the wall thereof. The trap means includes a pivoted floor means and a pivoted door means. The floor means is normally biased to a first position in which the exit from the trap into the container is totally blocked with the door means in this position being opened at the entrance to the trap so that already confined animals cannot escape through the trap while additional animals can enter the trap. When an animal enters the trap it tilts the floor means to a second position which simultaneously raises the door means and blocks the entrance while unblocking the exit thereby permitting an animal within the trap means to enter the container while precluding his escape from the trap means. Confining members in the form of slidable plates can be secured to a side portion of the collection means to direct animals that bypass the trap opening back in the direction of the trap.

3 Claims, 5 Drawing Figures

U.S. Patent  Aug. 1, 1978  Sheet 1 of 2  4,103,448
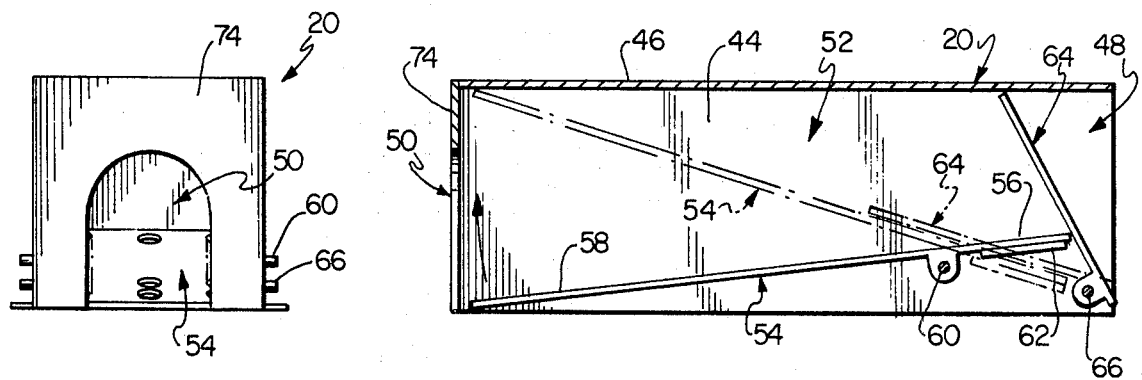
FIG. 4
FIG. 5
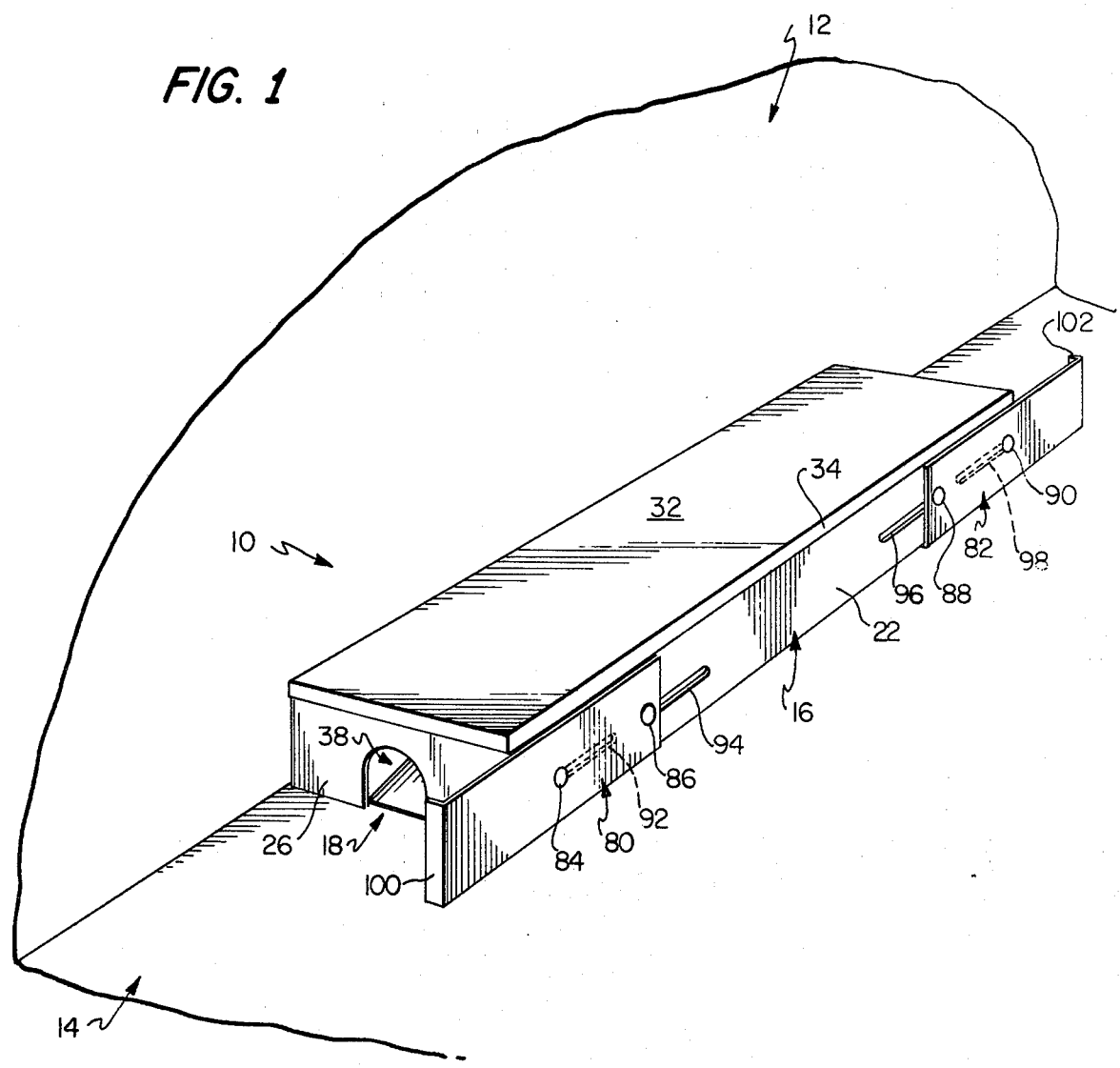
FIG. 1

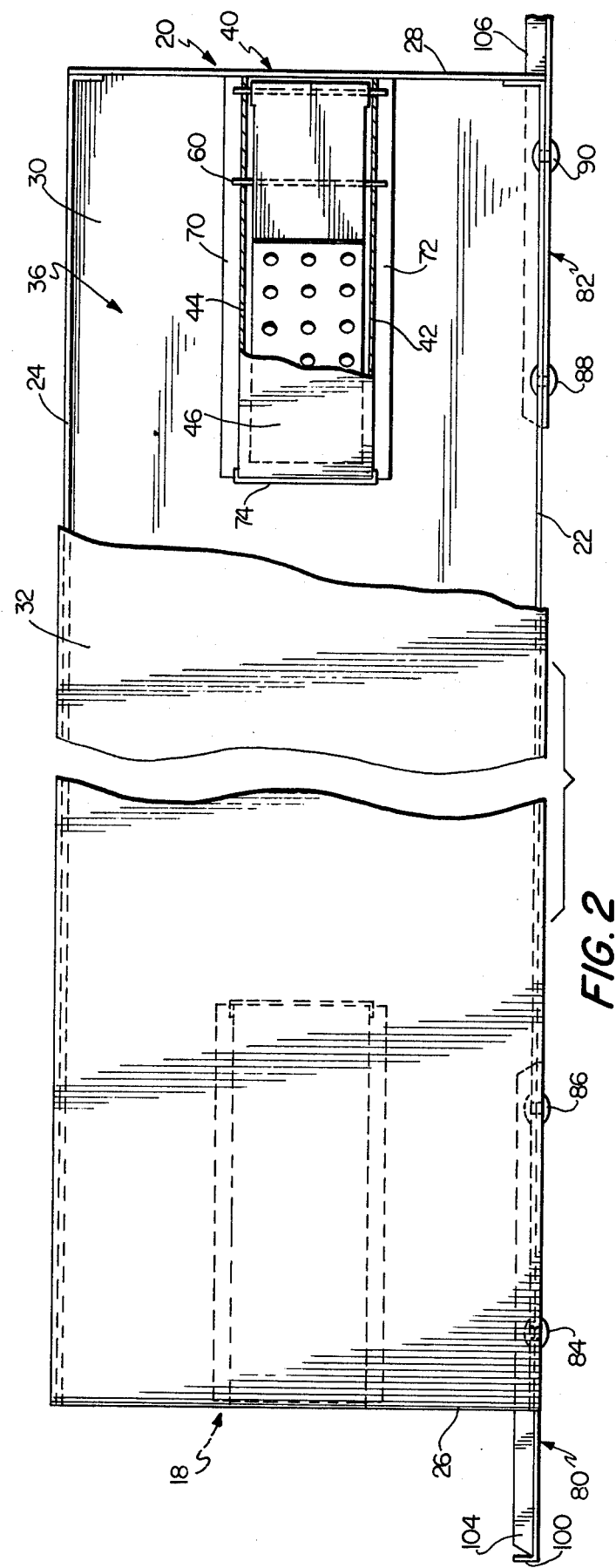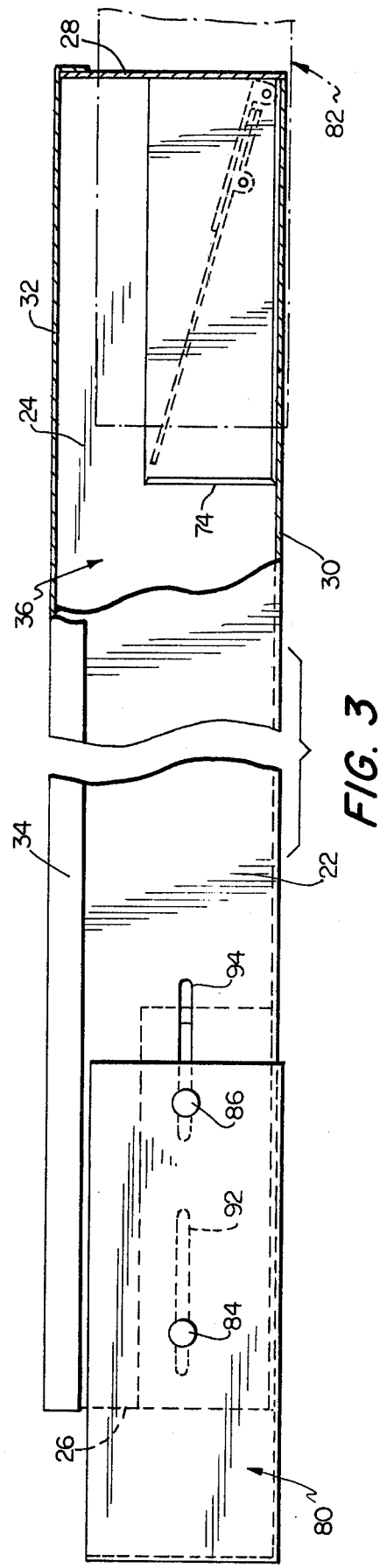
FIG. 2
FIG. 3

REPEATING ANIMAL TRAP WITH SIDE EXTENSION

This invention relates to a repeating animal trap and relates more particularly to a mouse or rat trap adapted to catch and confine a number of animals while automatically resetting itself.

Although the concepts of the instant invention are equally applicable to traps for animals of any size, devices of this type are primarily utilized in connection with the trapping of mice and rats. Repeating animal traps of this type have been well known heretofore, but such prior art traps have ordinarily required rather complex means to insure that an already trapped animal does not escape when the device automatically resets to receive additional animals. The complicated nature of such constructions not only increases the manufacturing costs, but additionally, results in more frequent break-downs minimizing the effectiveness and increasing the costs of maintenance with such devices.

Another area of difficulty with repeating animal traps and, in fact, with animal traps in general of the type with which the instant invention is concerned, is the tendency for an animal to be trapped to by-pass the entrance opening to the trap means. It is a well known tendency of mice and rats to stay close to walls in a room, rather than running into the open. If a trap is set against a wall, and includes bait, most mice, upon encountering the trap, will be attracted into it. Yet, some mice may pass by the entrance opening and thereby avoid being caught.

It is a primary object of this invention to provide a repeating animal trap which is extremely simple and inexpensive to manufacture and to maintain and yet which is highly efficient in operation. The animal trap of the instant invention includes a single mechanism which in its normal position permits entry of a mouse or the like into the trap means while confining already trapped mice within an enlarged container and which automatically precludes an animal from exiting the trap portion once it has significantly passed the entry opening, automatically resetting itself as the mouse passes completely through the trap means into the confining chamber.

Another object of this invention is to provide an animal trap having means to funnel an animal which has by-passed the entrance opening back toward the trap, using the natural tendency of mice to stay close to a wall or any device they encounter.

Other and further objects reside in the combination of elements, arrangement of parts and features of construction as will be pointed out in more detail hereinafter with respect to the accompanying drawings wherein:

FIG. 1 is a perspective view of one embodiment of repeating animal trap according to the instant inventive concepts shown in position with the confining means extended;

FIG. 2 is an enlarged top plan view, partially broken away for illustrative clarity and convenience;

FIG. 3 is a side elevational view thereof also partially broken away for illustrative clarity and convenience;

FIG. 4 is an exit end elevational view of one of the trap means; and

FIG. 5 is a longitudinal cross-sectional view through a trap means with the movable members being shown in one position in solid lines and in a further position in dotted lines.

Like reference characters refer to like parts throughout the several views of the drawings.

Referring now to the drawings, and more particularly to FIG. 1, a repeating animal trap according to the instant inventive concepts is designated generally by the reference numeral 10, and is shown as juxtaposed to a wall 12 on a floor 14. The device is shown as basically rectangular and it is to be understood that the size and specific shape of the device may be modified without departing from the instant inventive concepts although a rectangular trap would be most commonly used. Similarly, although the various elements are preferably formed of metal, other materials may be suitably substituted therefor, such as, for example, plastics.

The trap 10 comprises basically a collection means 16 and, in the embodiment shown, a pair of trap means 18, 20.

The collection means 16 comprises substantially parallel side walls 22, 24, end walls 26, 28, a bottom 30 and a preferably removable cover 32. The cover 32 can have a downwardly depending lip as shown at 34 and can be a single element as shown or, alternatively, only a portion of the cover could be removable as by hinging (not shown) in order to gain access to the enlarged container 36 adapted to confine trapped animals in a manner to be explained in more detail hereinafter.

In the embodiment shown an opening 38, 40 is defined in each of the end walls 26, 28, the number of openings in the collection means 16 being variable, although normally one opening at each end being preferred.

In any event, a trap means is interposed in each opening such that an animal must pass through a trap means to reach the container 36. The trap means 18, 20 are identical so that a detailed explanation with respect to only trap means 20 will be set forth.

The trap means 20 comprises side walls 42, 44 and a top wall 46. An entrance opening 48 communicating with the exterior of the collection means 16 through the opening 40 is defined at one end of the side and top walls 42, 44, 46. An exit opening 50 is defined at the opposite end of the side and top walls and communicates with the enlarged container 36, with an elongated passageway 52 extending between the entrance and exit openings 48, 50.

A floor means 54 extends substantially completely along the passageway 52 and includes an entrance end portion 56 and an exit end portion 58. Transversely extending floor pivot means 60 in the form of a pin or the like rotatably secures the floor means 54 to the side walls 42, 44 intermediate the entrance and exit end portions 56, 58 at a point closer to the entrance end portion 56. Thus, the position of the floor pivot 60 would normally bias the floor means 54 to the position shown in solid lines in FIG. 5. However, a counterbalancing weight means 62 is secured to the entrance end portion 56 in any desired manner so that the floor means 54 is normally biased by the means 62 to the dotted line position shown in FIGS. 3 and 5.

A door means 64 is pivoted at its lower end portion by a transversely extending door pivot means 66 to the side walls 42, 44 immediately adjacent the entrance opening 48. As will be seen from the drawings, the height of the door means 64 is greater than the height of the side walls 42, 44 so that the door means 54 cannot be pivoted to or pass a vertical relationship. Thus, the weight and inclination of the door means 64 normally biases the same to the dotted line position shown in FIGS. 3 and 5 wherein it rest on the entrance end portion 56 of the floor means 54. However, since the entrance end portion 56 of the floor means 54 terminates at a point just short of the door pivot means 66, as the floor means 54 is pivoted to the solid line position shown in FIG. 5 in a manner to be described in more detail hereinafter, it raises the door means 64 to the solid line position shown in FIG. 5.

When the floor means 54 and the door means 64 are in the dotted line position shown in FIGS. 3 and 5, it will be seen that the exit end portion 58 of the floor means 54 completely blocks the exit opening 50 while the entrance opening 48 is unblocked. This position of the floor and door means 54, 64, precludes escape of already trapped animals from within the container 36 while permitting additional animals to enter the trap means 20. As an animal passes through the entrance opening 48 onto the floor means 54 beyond the floor pivot means 60 the weight of the animal moves the floor means 54 to the solid line position shown in FIG. 5 and simultaneously raises the door means 64 to the solid line position shown in this Figure. In this position of the elements it will be seen that the entrance opening 48 is substantially completely blocked by the door means 64 precluding escape of an animal within the trap means 20. However, the exit opening 50 is unblocked in this position of the elements permitting the animal to pass into the container 36 in which it will be confined. Once the animal steps from the floor means 54, the counterbalancing means 62 returns the floor means 54 to its dotted line position and permits the door means 64 to drop to its dotted line position under the influence of its own weight and inclination, again precluding exit of animals within the container 36 while permitting entrance of additional animals into the trap means 20.

The sides 42, 44 may have flanges such as shown at 70, 72 to enable the trap means 20 to be secured as by spotwelding or the like to the floor 30 of the collection means 16. Similarly, an element such as shown at 74 may be secured over the exit end of the trap means 20 to define a slightly smaller exit opening 50 thereby facilitating complete blocking of this opening by simple movement of the floor means 54 to its dotted line position.

Thus, it will be seen that a simple combination of the floor means 54 and the door means 64, and the particular relationship between these elements, provides for automatically resetting the trap, while precluding the escape of already trapped animals. Bait may be placed within the container 36 and the floor means 54 may be provided with a multiplicity of apertures to enhance the odor transfer of the bait if desired.

According to a further feature of the instant inventive concepts, confining means are carried by the side wall 22 of the collection means 16 and are extendable to funnel an animal which might otherwise by-pass the various trap openings back toward the openings. Specifically, the confining means may comprise a pair of elongated plate members 80, 82 slidingly secured to the side wall 22 by pins or the like 84, 86, 88 and 90 slidingly engaged in slots 92, 94, 96 and 98 to permit the plates 80, 82 to be extended to the positions shown in the drawings. With the plate members 80, 82 extended in this manner a mouse or the like running along the wall 12 which engages the end 26 or 28 of the collection means 16 and by-passes the entrance opening 38 or 40 of the trap means 18, 20 would engage with one of the plate members and have a tendency to be redirected back toward the trap means. As indicated previously, this feature is particularly effective because of the tendency of a mouse not to run out in the open.

For packaging or storing the animal trap 10, or when the confining means are otherwise not to be used, the plate members 80, 82 may be slid toward each other into an out-of-the-way position. If desired, end flanges 100, 102 may be provided on the plate members 80, 82 to function as an additional stop and bottom flanges such as shown at 104, 106 may be included to facilitate the sliding movement, although generally the bottom flanges 104, 106 will not be necessary.

Thus, it will now be seen that there is herein provided an improved repeating animal trap, the use and operation of which is believed readily understood. This trap satisfies all of the objectives of the instant invention as defined above, and others, including many advantages of great practical utility and commercial importance. The trap will automatically reset itself and may be checked from time to time to remove animals confined within the container 36.

The embodiments of the invention in which an exclusive property or privilege is claimed are defined as follows:

1. In an animal trap including a collection means having parallel side walls, end walls, a top and a bottom and trap means defined in at least one of the end walls, one of the side walls being adapted to be juxtaposed to a wall in a room in which the trap is to be used, the improvement which comprises confining means carried by the other of the side walls of the collection means, said confining means including portions parallel to said other side wall and extendable beyond the point at which said other side wall meets an end wall containing a trap means to direct an animal passing the trap means back toward the trap means.

2. The improvement of claim 1 wherein trap means are defined in each end wall of the collection means, and said confining means comprises confining members including portions extendable beyond the point at which the other side wall meets each of the end walls.

3. The improvement of claim 1 wherein said confining means comprises an elongated plate, elongated slot means defined in the other side wall of the collection means, and pin means carried by said plate and slidingly received in said slot means.

* * * * *